US008364976B2

(12) United States Patent
Mackey et al.

(10) Patent No.: US 8,364,976 B2
(45) Date of Patent: Jan. 29, 2013

(54) PASS-THROUGH ADAPTER WITH CRYPTO IGNITION KEY (CIK) FUNCTIONALITY

(75) Inventors: Christopher D. Mackey, Spencerport, NY (US); Duncan G. Harris, Webster, NY (US); Michael D. Stevens, Avon, NY (US); Scott E. Bartholomew, Webster, NY (US)

(73) Assignee: Harris Corporation, Melbourne, FL (US)

( * ) Notice: Subject to any disclaimer, the term of this patent is extended or adjusted under 35 U.S.C. 154(b) by 1210 days.

(21) Appl. No.: 12/054,657

(22) Filed: Mar. 25, 2008

(65) Prior Publication Data

US 2009/0246985 A1 Oct. 1, 2009

(51) Int. Cl.
*H04L 29/06* (2006.01)

(52) U.S. Cl. .... 713/189; 439/119; 439/225; 439/620.21

(58) Field of Classification Search .................. 713/189, 713/192; 726/9, 20; 439/119, 225, 620.21, 439/638, 650, 651
See application file for complete search history.

(56) References Cited

U.S. PATENT DOCUMENTS

| | | | | |
|---|---|---|---|---|
| 4,972,470 | A * | 11/1990 | Farago | 713/192 |
| 4,997,392 | A * | 3/1991 | Lee | 439/589 |
| 5,696,880 | A * | 12/1997 | Gustafson et al. | 704/273 |
| 5,887,064 | A | 3/1999 | Seysen | 380/23 |
| 5,982,322 | A * | 11/1999 | Bickley et al. | 342/357.59 |
| 6,278,780 | B1 * | 8/2001 | Shimada | 380/47 |
| 6,581,825 | B1 * | 6/2003 | Rickerson, Jr. | 235/379 |
| 6,719,584 | B1 | 4/2004 | Favro et al. | 439/499 |
| 6,740,812 | B2 * | 5/2004 | DeWitt et al. | 174/650 |
| 6,782,475 | B1 * | 8/2004 | Sumner | 713/163 |
| 7,136,995 | B1 * | 11/2006 | Wann | 713/153 |
| 7,184,274 | B2 * | 2/2007 | Wu et al. | 361/752 |
| 7,210,044 | B2 * | 4/2007 | Lai et al. | 713/193 |
| 7,269,739 | B2 * | 9/2007 | Keohane et al. | 713/189 |
| 7,347,731 | B1 * | 3/2008 | Gilmore et al. | 439/587 |
| 7,396,257 | B2 * | 7/2008 | Takahashi | 439/620.21 |
| 7,440,287 | B1 * | 10/2008 | Ni et al. | 361/752 |
| 7,494,383 | B2 * | 2/2009 | Cohen et al. | 439/638 |
| 7,540,667 | B2 * | 6/2009 | Murano | 385/60 |
| 7,591,425 | B1 * | 9/2009 | Zuili et al. | 235/383 |
| 7,610,016 | B2 * | 10/2009 | Schmitt et al. | 455/41.2 |
| 7,673,337 | B1 * | 3/2010 | Osburn et al. | 726/12 |
| 7,881,675 | B1 * | 2/2011 | Gazdzinski | 455/74.1 |

(Continued)

OTHER PUBLICATIONS

Hessel, Clifford; "Passive Protection Against Security Compromise or Possible Insecurity When Information/Communications Devices are Lost", Military Communications Conference, IEEE, Oct. 13-16, 2003, vol. 2, pp. 758-760.*

(Continued)

*Primary Examiner* — Carl Colin
*Assistant Examiner* — Victor Lesniewski
(74) *Attorney, Agent, or Firm* — Allen, Dyer, Doppelt, Milbrath & Gilchrist, P.A.

(57) ABSTRACT

A pass-through adapter includes an adapter body having at least two connector pin interfaces, with one configured for coupling to an external device such as a communications device. Each connector pin interface includes a plurality of connector pins, including a plurality of pass-through connector pins operative with each other for in-line, pass-through signaling when the pass-through adapter is coupled to the external device. A crypto ignition key (CIK) circuit is contained within the adapter body and connected to at least one of the connector pins to provide a secure mode of operation for the external device.

18 Claims, 4 Drawing Sheets

U.S. PATENT DOCUMENTS

| | | | | |
|---|---|---|---|---|
| 8,238,971 | B2 * | 8/2012 | Terlizzi | 455/557 |
| 2003/0236983 | A1 | 12/2003 | Mihm, Jr. | 713/172 |
| 2004/0022390 | A1 * | 2/2004 | McDonald et al. | 380/277 |
| 2005/0210234 | A1 * | 9/2005 | Best et al. | 713/151 |
| 2006/0256968 | A1 * | 11/2006 | Lemasson | 380/270 |
| 2007/0033320 | A1 * | 2/2007 | Wu et al. | 711/100 |
| 2007/0162748 | A1 * | 7/2007 | Okayama et al. | 713/165 |
| 2007/0192629 | A1 * | 8/2007 | Saito | 713/193 |
| 2007/0250872 | A1 * | 10/2007 | Dua | 725/81 |
| 2008/0090469 | A1 * | 4/2008 | Owen et al. | 439/699.2 |
| 2008/0181406 | A1 * | 7/2008 | Iyer et al. | 380/277 |
| 2008/0294906 | A1 * | 11/2008 | Chang et al. | 713/182 |
| 2009/0129594 | A1 * | 5/2009 | Weissman et al. | 380/255 |
| 2010/0248546 | A1 * | 9/2010 | McCoy | 439/620.21 |
| 2011/0217874 | A9 * | 9/2011 | Betts-LaCroix | 439/620.21 |

OTHER PUBLICATIONS

Varshaysky, Alex; LaMarca, Anthony; de Lara, Eyal; "Enabling Secure and Spontaneous Communication between Mobile Devices using Common Radio Environment", Eighth Workshop on Mobile Computing Systems and Applications, Mar. 8-9, 2007, pp. 9-13.*

Karasawa, Kei; Kira, Yusuke; Tsuchiya, Yoshitsugu; Yamada, Kohji; Takahashi, Kenji; "A Detachable IPsec Device for Secure Consumer Communication", Second IEEE Consumer Communications and Networking Conference, Jan. 3-6, 2005, pp. 608-610.*

* cited by examiner

PASS-THROUGH ADAPTER WITH CRYPTO IGNITION KEY (CIK) FUNCTIONALITY

FIELD OF THE INVENTION

The present invention relates to secure communications and encryption systems, and more particularly, the present invention relates to a Crypto Ignition Key (CIK).

BACKGROUND OF THE INVENTION

Many cryptographic devices that use cryptographic or other secure functions require the use of a crypto ignition key (CIK) that consumes needed mounting space on the devices along with the input/output (I/O) connectors, buttons, switches and displays that are located on the device panels. Many current off-the-shelf CIK's are not submersible or waterproof. This functionality is becoming increasingly important when CIK's are used with radios and other communications devices in harsh environments such as when radios and associated CIK's are carried through mud, excessive rain, or even under water. Also, current CIK's have separate mechanical and electrical interfaces with one electrical interface dedicated to the user, input/output function and another electrical interface dedicated to the CIK function. Many of these CIK devices include a separate mechanical interface that occupies a significant mechanical volume.

There are current CIK's used with a Secure Telephone Unit third generation (STU-III), which are conventional secure telephone systems used by governments to provide different levels of secure communications. The CIK plugs into a normal telephone jack, but requires a security control key to access other STU-III units. For example, a connection is made and the caller asks a called party to "go secure." The parties place their CIK into their respective phone terminal, and switch it on, for example, by having one party press a secure button to establish a secure connection. Tactical radios can use a similar system. Other CIK's are used with IDE cards, including a key box that connects into a personal computer or other electronic device. In any event, these devices and systems that use CIK's often require separate mechanical and electrical interfaces and provide for no pass-through signaling. Also, they are typically not submersible.

SUMMARY OF THE INVENTION

A pass-through adapter includes an adapter body having at least two connector pin interfaces with one configured for coupling to an external device such as a communications device, e.g., a radio transceiver. Each connector pin interface includes a plurality of connector pins, including a plurality of pass-through connector pins operative with each other for in-line, pass-through signaling when the pass-through adapter is coupled to the external device. A crypto ignition key (CIK) circuit is contained within the adapter body and connected to at least one of the connector pins to provide a secure mode of operation for the external device.

In one non-limiting aspect, the connector pin interface that couples to an external device includes at least one connector pin dedicated to the CIK circuit without pass-through signaling. A greater number of connector pins are formed on the connector pin interface having the at least one dedicated connector pin than on the other connector pin interface.

In another aspect, the CIK circuit is connected to the pass-through connector pins in a tapped configuration. Each connector pin interface in this configuration is formed as an equal number of connector pins. The CIK circuit can be addressed by differential signaling, modulated signaling, or multi-drop.

In another aspect, the connector pin interfaces are configured to provide a watertight seal when externally coupled. The adapter body is hermetically sealed for submersible operation. The CIK circuit can be part of a printed wiring board embedded within the adapter body. The connector pin interfaces can be formed as a plug style interface.

The external device can be formed as a communications device that includes a radio housing and radio circuit contained within the radio housing. A plurality of connection interfaces can be carried by the radio housing and connected to the radio circuitry. The pass-through adapter can be coupled to one of the connection interfaces and provide for a secure mode of operation for the radio circuit.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting example of the present invention, the pass-through adapter includes a crypto ignition key (CIK) circuit having non-dedicated electrical and mechanical interfaces. It allows for a more flexible crypto ignition key circuit functionality and mechanical packaging. The crypto ignition key circuit uses a connector pin interface to permit mating devices to off-load crypto ignition key functions if required. It also allows for filtering of individual signals and is fully electrostatic discharge (ESD) protected in one non-limiting example. It is also submersible because the adapter body is hermetically sealed and the connector pin interfaces form a watertight seal when coupled to other devices.

The pass-through adapter and its crypto ignition key circuit, in accordance with a non-limiting example of the present invention, combines input/output (I/O) port and crypto ignition key functions into a single, in-line pass-through adapter device. The crypto ignition key circuit interface can use dedicated connector pins or tapped signals through pass-through connector pins. Input/output functions can also pass-through signals. This type of configuration frees up any man/machine interface (MMI) for additional features by combining functions, making any radios, phones and other communications devices easier to use, while adding additional functional features into a limited space. The packaging is environmentally robust and submersible. The pass-through adapter can be operable with a tactical key loader and other communications devices.

The crypto ignition key circuit includes a printed wiring board (PWB) that could support an EEPROM chip having the various key and encryption functions in one non-limiting example. The CIK circuit has high storage capacity, typically even more than the 64 KIB used to store multiple encryption keys standard in many CIK's. Its small contact configuration makes it amenable for many different communications device applications such as radios and similar applications.

Figure 1:
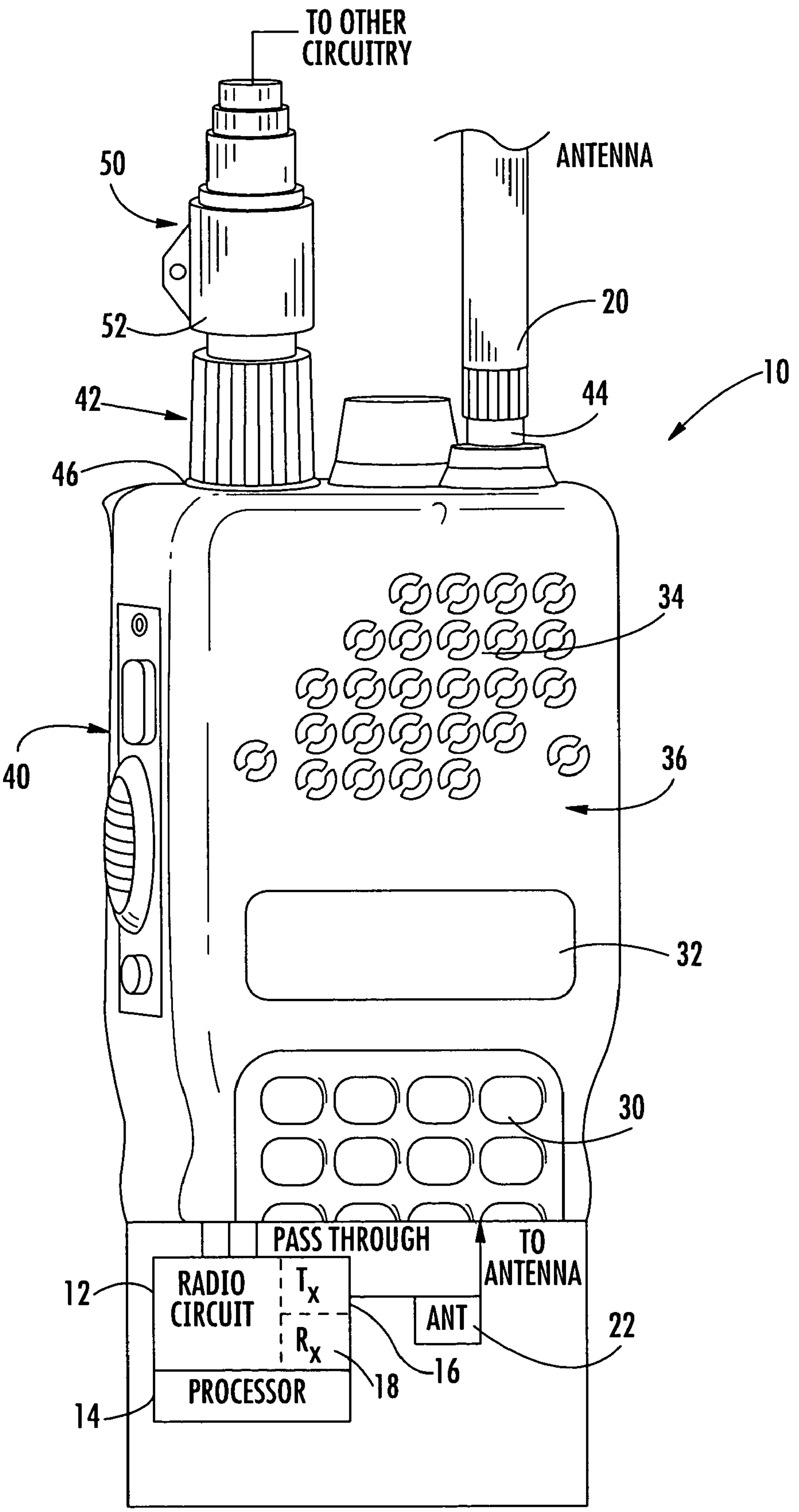
FIG. 1 a fragmentary and partial perspective view of a portable wireless communications device and showing the pass-through adapter connected onto a connection interface at the top of the communications device and connected into the radio circuit to provide for secure operation and pass-through signaling.

FIG. 1 is a partial fragmentary and perspective view of a communications device 10 as a portable wireless communications device such as an AN/PRC-152 tactical radio produced by Harris Communications in Rochester, N.Y. and headquartered in Melbourne, Fla. This device 10 as a radio includes a basic radio circuit 12 and processor 14, including transmitter and receiver circuits 16, 18 that transmit and receive signals through an antenna 20 and associated antenna circuit 22. The radio includes a keyboard 30, display 32 and speaker 34 on the front panel 36. Side-mounted controls 40 are illustrated. Connection interfaces 42 are carried by the radio housing at the top surface and include the antenna connection 44 and a connection interface 46 in which the pass-through adapter 50 in accordance with a non-limiting example of the present invention can couple.

The pass-through adapter 50 will connect to other devices and circuitry such that some communications signals can pass-through into the radio circuit 12 or other circuit (not illustrated). This pass-through signaling could include signals for reconfiguring the radio, upgrading or for maintenance as pass-through signals. The pass-through adapter 50 includes crypto ignition key (CIK) circuit contained within the adapter body 52 and connected to at least one of the connector pins coupled to the connection interface on the radio housing to provide a secure mode of operation for the radio circuit as explained below.

Figure 2:
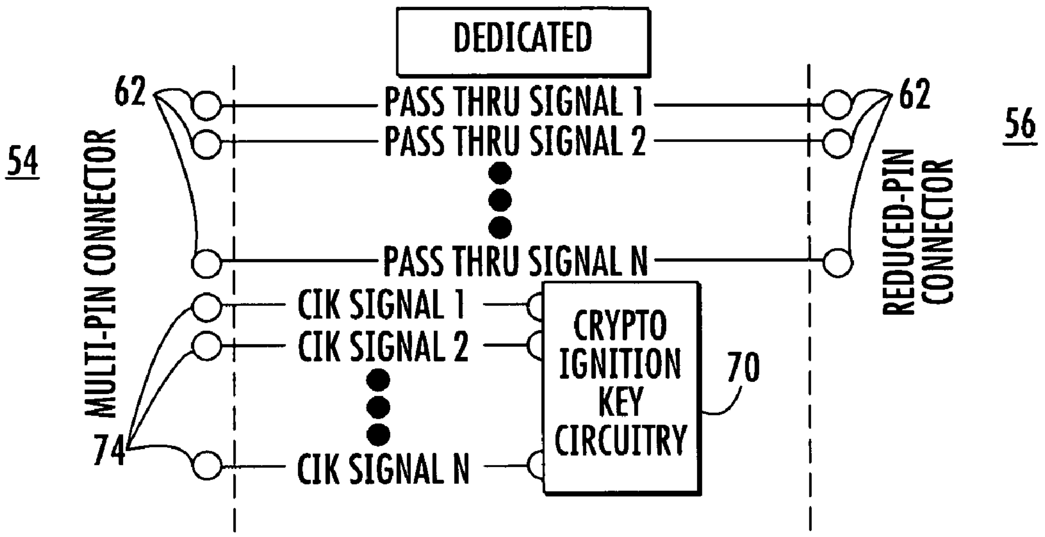
FIG. 2 is a high-level circuit diagram of the pass-through adapter having a dedicated crypto ignition key circuit in accordance with a non-limiting example of the present invention and showing a multi-pin connector interface and reduced-pin connector interface that allows pass-through signaling.
Figure 3:
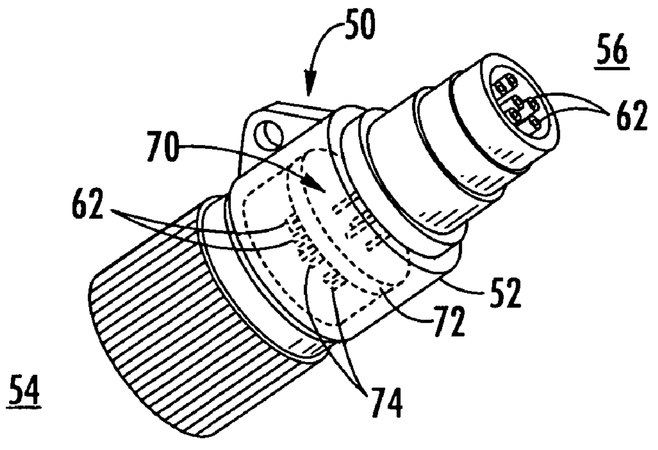
FIG. 3 is a perspective and partial cut-away view of the pass-through adapter and showing the crypto ignition key circuit and its printed wiring board in a design similar to the circuit shown in FIG. 2 in accordance with a non-limiting example of the present invention.
Figure 4:
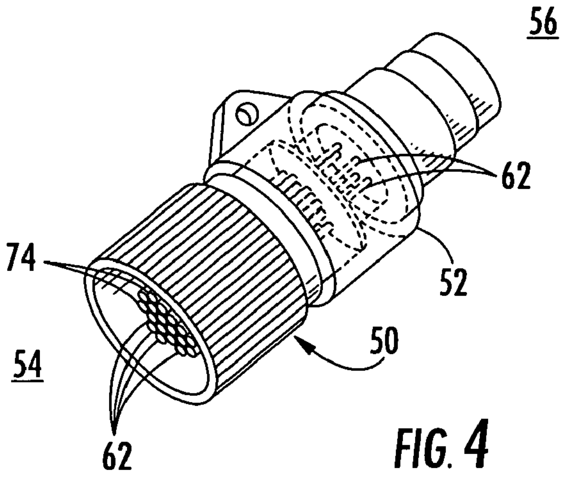
FIG. 4 is a reverse perspective and partial cut-away view of the pass-through adapter and crypto ignition key circuit shown in FIG. 3.
Figure 5:
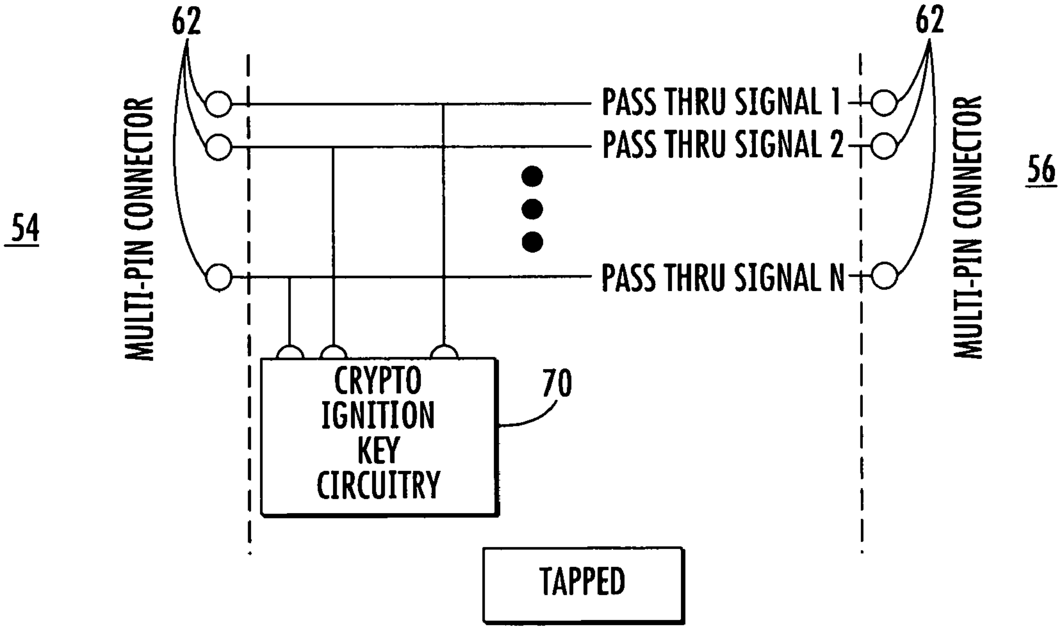
FIG. 5 is another circuit diagram of another embodiment of the pass-through adapter and crypto ignition key circuit that uses a tapped configuration.
Figure 6:
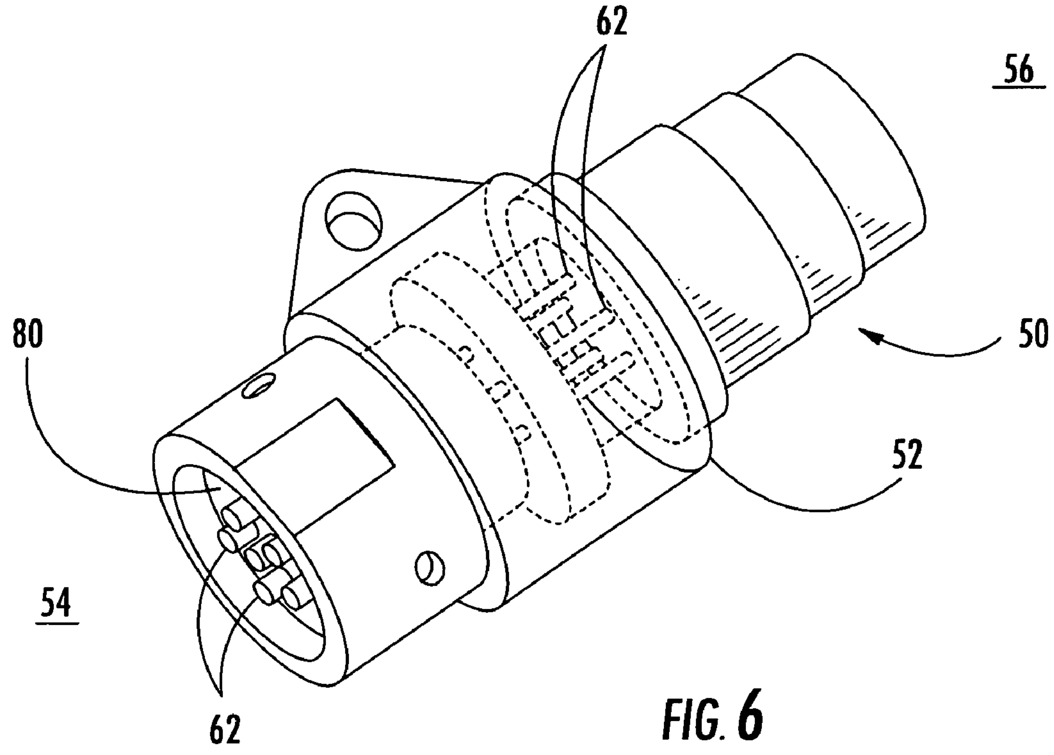
FIG. 6 is a perspective and partial cut-away view of the pass-through adapter and showing the crypto ignition key circuit for the circuit shown in FIG. 5 in accordance with a non-limiting example of the present invention.

As shown in FIGS. 3, 4 and 6, the pass-through adapter 50 includes the adapter body 52 having two connector pin interfaces 54, 56. One interface is coupled to the connection interface 46 on the radio housing 36 as illustrated in FIG. 1. Each connector pin interface 54, 56 is formed with a plurality of connector pins, including a plurality of pass-through connector pins 62 operative with each other for in-line, pass-through signaling to the radio circuit 12 or other electronic device to which the pass-through adapter is coupled. These pass-through connector pins 62 are illustrated schematically in FIGS. 2 and 5 and shown in the views of FIGS. 3, 4 and 6.

The crypto ignition key (CIK) circuit 70 is contained within the adapter body 52, such as an EEPROM on a printed wiring board 72, and connected to at least one of the connector pins coupled to the connection interface on the radio housing to provide a secure mode of operation for the radio circuit (or other electronic device to which the pass-through adapter is coupled). In one aspect, a number of connector pins would be dedicated connector pins 74 for the CIK circuitry 70 to allow communication of dedicated CIK signals only to the CIK circuit 70. Thus, at least one connector pin 74 is dedicated to the CIK circuit without pass-through signaling as shown in FIG. 2. This connector pin interface 54 coupled to the connection interface on the radio housing has a greater number of connector pins than the other connector pin interface 56 as shown in FIGS. 2-4.

In yet another aspect, the CIK circuit is connected to pass-through connector pins 62 in a tapped configuration as shown in FIG. 5. In this configuration, each connector pin interface 54, 56 is formed with an equal number of connector pins as shown in FIGS. 5 and 6. The CIK circuit 70 can be addressed by differential signaling from the radio circuit 12 as a non-limiting example. For example, the CIK circuit 70 can be connected on a short stub circuit connection or other circuit connection and use pull-up resistors in one non-limiting example. In this type of circuit configuration using a tapped CIK circuit 70 as shown in FIG. 5, it is possible that the difference between voltages convey data with one polarity of voltage indicating a logic one level and a reverse polarity indicating a logic zero. The CIK circuit 70 could be connected in a point-to-point or multi-dropped node configuration with a master/slave arrangement, for example, the RS-485 (EIA-485) OSI model physical layer electrical specification for two-wire, half-duplex, multipoint serial connection interfaces. It is also possible to use an Inter-Integrated Circuit ($I^2C$) configuration and circuit. $I^2C$ uses two bidirectional lines with a serial data (SDA) and serial clock (SCL) and pull-up resistors. Different master and slave nodes could be used and a master transmit and receive and a slave transmit and receive circuit configuration could be used. It is possible to use differential signaling, modulated signaling, or multi-drop to address the CIK circuit 70.

In each circuit configuration, however, the connector pin interfaces 54, 56 are configured to provide a watertight seal when externally coupled to any other cables or devices. The adapter body 52 is hermetically sealed for submersible operation. The adapter body 52 can be formed from a number of different materials using different techniques, including metal or rigid plastic materials or more elastic materials for greater flexibility. For example, the connector pin interfaces 54, 56 could be formed as a plug-style interface commonly used with different military connectors. Screw type configurations could also be used that would allow parts of the adapter body that connect to a communications device to be threaded into a secure connection. A shell or other threaded barrel could rotate relative to other components of the adapter body to provide a secure, threaded connection. The adapter body could include a back shell and different type of coupling rings. It could also include an insert (FIG. 6) in each connector pin interface 54, 56 as a molded portion of insulation in one non-limiting example to support the connector pins on either connector pin interface 54, 56. The insert 80 can be resilient or hard depending on the connection. A resilient insert 80 would aid in waterproofing the connector pin interfaces 54, 56. Other connector designs can be used.

As illustrated, the adapter body 52 is cylindrically configured and includes opposing ends with a multi-pin connector interface using the same number of pins as in FIGS. 5 and 6 or a reduced pin connector interface as in FIGS. 2-4.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A pass-through adapter comprising:

a hermetically sealed adapter body having opposing ends and comprising a connector pin interface formed at each opposing end, wherein each connector pin interface is configured to form a watertight seal when externally coupled, and further comprising a plurality of pass-through connector pins operative with each other for in-line, pass-through signaling when the pass-through adapter is coupled to an external device, wherein the connector pins are arranged in a non-planar, coaxial configuration and terminating at each end at respective connector pin interfaces; and a crypto ignition key (CIK) circuit sealed within the adapter body that stores encryption keys and is connected to at least one of said connector pins in a tapped configuration to provide a secure mode of operation for the external device, where, in the secure mode of operation, the signaling is acted upon by encryption functions of the CIK circuit.

2. The adapter according to claim 1, wherein said connector pin interface configured to be coupled to an external device comprises at least one connector pin dedicated to said CIK circuit without pass-through signaling.

3. The adapter according to claim 2, wherein said connector pin interface having said at least one dedicated connector pin has a greater number of connector pins than the other connector pin interface.

4. The adapter according to claim 1, wherein each connector pin interface comprises an equal number of connector pins.

5. The adapter according to claim 1, wherein said CIK circuit is addressed by differential signaling, modulated signaling, or multi-drop.

6. The adapter according to claim 1, wherein said CIK circuit comprises a printed wiring board embedded within said adapter body.

7. The adapter according to claim 1, wherein each connector pin interface comprises a plug-style interface.

8. The adapter according to claim 1, wherein said connector pin interface configured for connecting to an external device is configured for connecting to a communications device.

9. A communications device comprising:

a radio housing;

a radio circuit contained within said radio housing;

a plurality of connection interfaces carried by said radio housing and connected to said radio circuitry; and a pass-through adapter comprising a hermetically sealed adapter body having opposing ends and comprising a connector pin interface formed at each end and one interface coupled to a connection interface on the radio housing, wherein each connector pin interface is configured to form a watertight seal when externally coupled and further comprising a plurality of pass-through connector pins operative with each other for in-line, pass-through signaling to the radio circuit through the connection interface to which the pass-through adapter is connected, wherein the connector pins are arranged in a non-planar, coaxial configuration and terminating at each end at respective connector pin interfaces; and a crypto ignition key (CIK) circuit sealed within the adapter body that stores encryption keys and is connected to at least one of said connector pins coupled to said connection interface on the radio housing in a tapped configuration to provide a secure mode of operation for the radio circuit, where, in the secure mode of operation, the signaling is acted upon by encryption functions of the CIK circuit.

10. The communications device according to claim 9, and further comprising at least one connector pin dedicated to said CIK circuit without pass-through signaling.

11. The communications device according to claim 10, wherein said connector pin interface coupled to the connection interface on the radio housing has a greater number of connector pins than the other connector pin interface.

12. The communications device according to claim 9, wherein each connector pin interface comprises an equal number of connector pins.

13. The communications device according to claim 9, wherein said CIK circuit is addressed by differential signaling, modulated signaling, or multi-drop.

14. The communications device according to claim 9, wherein said connector pin interface connected to said connector interface on said radio housing comprises a plug-style interface.

15. A secure communications method, comprising:

passing signals through a pass-through adapter that is coupled to an external device, wherein the pass-through adapter comprises a hermetically sealed adapter body having opposing ends and a connector pin interface formed at each opposing end, and wherein each connector pin interface is configured to form a watertight seal when externally coupled, and wherein one interface is coupled to the external device and including a plurality of pass-through connector pins at each connector interface and operative with each other for in-line, pass-through signaling to the external device, wherein the connector pins are arranged in a non-planar, coaxial configuration and terminating at each end at respective connector pin interfaces; and operating the external device in a secure mode by addressing a crypto ignition key (CIK) circuit, that is sealed within the adapter body and that stores encryption keys, through connector pins that are connected in a tapped configuration to the CIK circuit, where, in the secure mode, the signals are acted upon by encryption functions of the CIK circuit.

16. The method according to claim 15, which further comprises addressing the CIK circuit through at least one connector pin dedicated to the CIK circuit.

17. The method according to claim 15, which further comprises addressing the CIK circuit from at least one pass-through connector pin.

18. The method according to claim 17, which further comprises addressing the CIK circuit using differential signaling, modulated signaling, or multi-drop.

* * * * *